United States Patent [19]

Hosoi et al.

[11] Patent Number: 5,346,539
[45] Date of Patent: Sep. 13, 1994

[54] FLAME-RETARDANT ADHESIVE

[75] Inventors: Norihiro Hosoi; Shuji Azuma, both of Osaka, Japan

[73] Assignee: Sumitomo Electric Industries, Ltd., Japan

[21] Appl. No.: 37,380

[22] Filed: Mar. 26, 1993

[30] Foreign Application Priority Data

Jul. 26, 1991 [JP] Japan .................. 3-209935
Jul. 22, 1992 [JP] Japan .................. 4-217336

[51] Int. Cl.$^5$ .............................................. C09D 5/18
[52] U.S. Cl. ..................... 106/18.12; 106/18.13; 106/18.21; 106/18.24; 106/18.25; 106/18.26; 106/18.27; 106/18.28; 428/34.9; 428/35.1; 428/921; 252/601; 252/609
[58] Field of Search .............. 106/18.12, 18.13, 18.21, 106/18.24, 18.25, 18.26, 18.27, 18.28; 428/921, 34.9, 35.1; 252/601, 609

[56] References Cited

U.S. PATENT DOCUMENTS

| | | | |
|---|---|---|---|
| 3,418,267 | 12/1968 | Busse | 106/18.24 |
| 3,419,518 | 12/1968 | Mahling et al. | 106/18.25 |
| 3,836,501 | 9/1974 | Tacke et al. | 106/18.25 |
| 4,606,853 | 8/1986 | Williams | 106/18.25 |
| 4,632,951 | 12/1986 | Fuhr et al. | 106/18.25 |

*Primary Examiner*—Anthony Green
*Attorney, Agent, or Firm*—Wenderoth, Lind & Ponack

[57] ABSTRACT

Disclosed is a flame-retardant hot-melt adhesive to be applied to the inner surface of a heat-shrinkable tube, It contains 100 parts by weight of a resin composition having an MI value (190° C.) of 30–220, 5–40 parts by weight of a chloric or bromic flame-retardant, 1–30 parts by weight of an inorganic flame-retardant and 0.1–20 parts by weight of fine powder having an average particle diameter between 0.01 and 40 microns. It is a flame-retardant adhesive which shows good fluidity when subjected to external force and no dropping occurs if it burns.

6 Claims, 2 Drawing Sheets

FLAME-RETARDANT ADHESIVE

This is a continuation-in-part of PCT/JP92/00930, filed Jul. 22, 1992.

TECHNICAL FIELD

The present invention relates to a flame-retardant hot-melt adhesive applied to the inner surface of a heat-shrinkable tube.

BACKGROUND ART

Conventional hot-melt adhesives adapted to be applied to the inner surface of a heat-shrinkable tube contain such resin compositions as EVA (ethylene-vinyl acetate copolymer), EEA (ethylene acrylate copolymer), modified polyolefins, polyamides or fluororesins. Further, tackifiers such as coumarone-indene resins, phenol terpene resins or polybutene resins are added to impart adhesiveness.

On the other hand, bromic or chloric substances are used as flame-retardants. Since bromic flame-retardants ape higher in flame retardancy, they are more frequently used. Such flame-retardants include hexabromobenzene, decabromodiphenyl oxides, ethylene-bis-tetrabromophthalimide, tetrabromo-bisphenol A derivatives and octabromodiphenyl oxides. Inorganic flame-retardants include antimony trioxide, antimony pentoxide, magnesium hydroxide and ammonium polyphosphate.

It is well-known that a high polymeric material shows thixotropy if fine powder is dispersed in the material. This characteristic is widely used for sealing materials and paints. As fine powders to be added to a material to impart thixotropy to the material, silica having an average particle diameter of several microns and hydrate aluminas having an average particle diameter of 1.2 microns or less are known as shown in Japanese Examined Patent Publications 54-37665 and 55-29107. Also, in applications where both flame-retardancy and waterproofness are required, trials have been made to add to such fine powder flame-retardants or substances which show flame retardancy as disclosed e.g. in Japanese Unexamined Patent Publication 61-254686.

Considering the object of a flame-retardant hot-melt adhesive to be applied to an inner layer, it is required that its fluidity increase when heated. But, since the fluidity also increases when burning, the adhesive may flow, increasing the possibility of spreading flames. It is possible to make use of the thixotropy effect in order to increase the apparent viscosity while burning, that is, while the adhesive is subjected to a relatively small external force, and thus to prevent the adhesive from flowing during burning. But if the amount of fine powder added is increased in order to increase the thixotropy effect. high fluidity would not be obtained. This increases the viscosity of the adhesive during waterproof treatment to such an extent that no sufficient packing is possible. Thus, the waterproof properties are bad.

DISCLOSURE OF THE INVENTION

It is an object of the present invention to solve the above problems and to provide a flame-retardant adhesive which shows good fluidity when subjected to external force and no dropping occurs if it burns. It is characterized in that it contains, with respect to 100 parts by weight of a resin composition having an MI value (at 190° C.) of 30-220, 5-40 parts by weight of a chloric or bromic flame-retardant, 1-30 parts by weight of an inorganic flame-retardant and 0.1-20 parts by weight of silica in the form of fine powder having an average particle diameter between 0.01 micron and 40 microns.

Further, a chloric or bromic flame-retardant should be added to impart flame retardancy to the adhesive. Further, an inorganic flame-retardant should be added as a flame-retardant aid to reduce the total amount of flame-retardants added.

The flame retardancy of the entire tube can be increased markedly if the tube having a flame-retardant adhesive applied to the inner surface thereof has a flame retardancy high enough to pass the All Tubing Flame Test, which is a flame-retardancy evaluation test defined in the UL standard.

BEST MODE FOR EMBODYING THE INVENTION

According to the present invention, 5–40 parts by weight of chloric or bromic flame-retardant and 1–30 parts by weight of an inorganic flame-retardant should be added with respect to 100 parts by weight of a resin composition.

The resin composition should be a resin obtained by polymerizing ethylene and vinyl acetate as main monomers and having a melting point between 60° C. and 100° C., a polyester resin having a melting point between 80° C. or 190° C. or a polyamide resin having a melting point between 50° C. and 95° C.

In order to impart flame retardancy with a minimum amount of flame-retardants added, if the flame-retardants are chloric ones, they should have a chlorine content of 65 wt % or more, preferably 66 wt % to 79 wt %. In case of bromic flame-retardants, they should have a bromine content of 60–88 wt %, preferably 65–85 wt %. A preferable inorganic flame-retardant is an antimony oxide, especially antimony trioxide. By adding it, the flame retardancy of the hot-melt adhesive increases sufficiently. For example, if this fiame-retardant is added e.g. to a resin having the lowest MI value, such as a composition containing polyethylene as a main component, its flame retardancy can be increased to a level equal to or higher than the V-1 level under UL-94 or by properly selecting a proper resin, its flame retardancy can be increased even to the V-0 level.

But in case of a hot-melt adhesive, it is required that when heated it flow into between the tube and the coating in a sufficient amount and completely fill the gap therebetween. For this purpose, its viscosity has to be sufficiently low at high temperatures. But, the low viscosity at high temperatures means that the adhesive is more likely to flow when burned. If the burning adhesive flows and drips onto the floor, the fire will spread. Thus, such an adhesive is required to show high flowability when coating a tube and not to flow and drop when burned.

In order to impart these mutually contradictory properties to the adhesive, a phenomenon called thixotropy should be used. This is the phenomenon in which the material shows high fluidity while it is subjected to an external force and once the external force is removed, its fluidity decreases extremely. In order for the resin to reveal this property, powder having a small particle diameter, e.g. fine powder having an average particle diameter of 0.01–40 microns should be preferably added.

But, if the thixotropy effect appears too strongly, the fluidity of the adhesive will be too low during normal shrinking treatment, at which time the adhesive is required to show high fluidity. Thus, for use in applications where high waterproof properties are is required. Waterproof properties as well as flame retardancy have to be controlled in a highly balanced manner. None of the conventional adhesives is satisfactory in balance among waterproof properties, flame retardancy and thixotropy. Thus they cannot be used for waterproofing of a wire harness.

Figure 1:
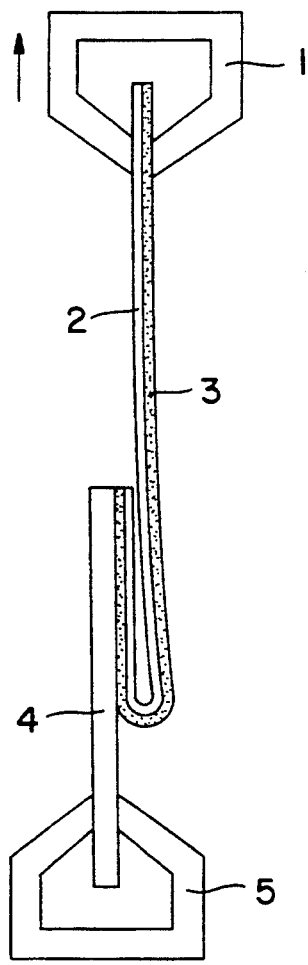
FIG. 1 is a schematic view showing how to measure the bond strength.

Further, the insulating layer of a wire forming such a wire harness is ordinarily made of PVC, polyethylene or ethylene-vinyl acetate copolymer or a mixture of two or more of the above substances. The results of various experiments showed that, in order to maintain waterproofness at a sufficient level with a cryogenic cycle and stresses applied thereto, the adhesive is required to have a bond strength of 0.2 kg/cm or more to PVC, polyethylene and ethylene-vinyl acetate copolymer when measured in the manner shown in FIG. 1 wherein 1 represents the chuck of the tensile tester (upside), 2 represents the adhesive-applied sheet, 3 represents the flame-retardant adhesive, 4 represents the body to which the sheet is bonded and 5 represents the chuck of the tensile tester (fixed side).

As will be apparent from the above description, it is preferable to add a fine powder having a particle diameter or 0.01 to 40 microns, preferably 0.01 to 4 microns. Though the kind of powder to be added is not limited, silica ($SiO_2$) is preferable considering its effect on the bond strength and heat aging property, because silica is considered to be physically inert.

A proper amount of and a suitable kind of antioxidant (which is not limited but may be IRGANOX 1010 made by Chiba-Geigy or SUMILIZER BHT made by Sumitomo Chemical Co., Ltd.) may be added to the tube and the adhesive according to the temperature environment.

The heat-shrinkable tube according to the present invention should comprise a base resin which comprises one or a mixture or two of polyethylene, an ethylene-vinyl acetate copolymer and an ethylene-ethyl acrylate copolymer, 5–40 parts by weight of a chloric or bromic flame-retardant, 1–30 parts by weight of inorganic flame-retardant, an antioxident and a processing aid.

Figure 2:
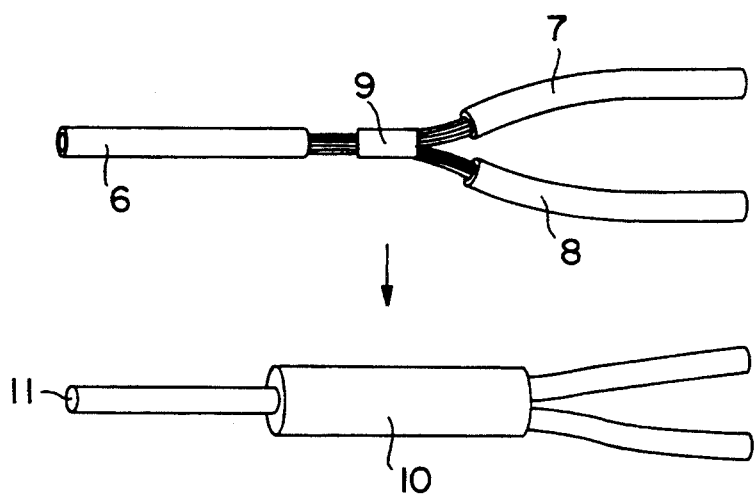
FIG. 2 is a view showing an example of a harness joint.

A heat-shrinkable tube to the inner surface of which the flame-retardant adhesive according to the present invention was applied was covered to the connection of a wire harness formed by PVC-insulated wires and heat to shrink it on to the wire harness, as shown in FIG. 2 wherein 6 represents a PVC tube, size 4 square, 7 represents a tube size 3 square, 8 represents a tube size 3 square and 9 represents caulking, 10 represents the heat-shrinkable tube with flame-retardant and 11 represents the wire harness after the PVC tubes have been heated and shrunk thereon.

Figure 3:
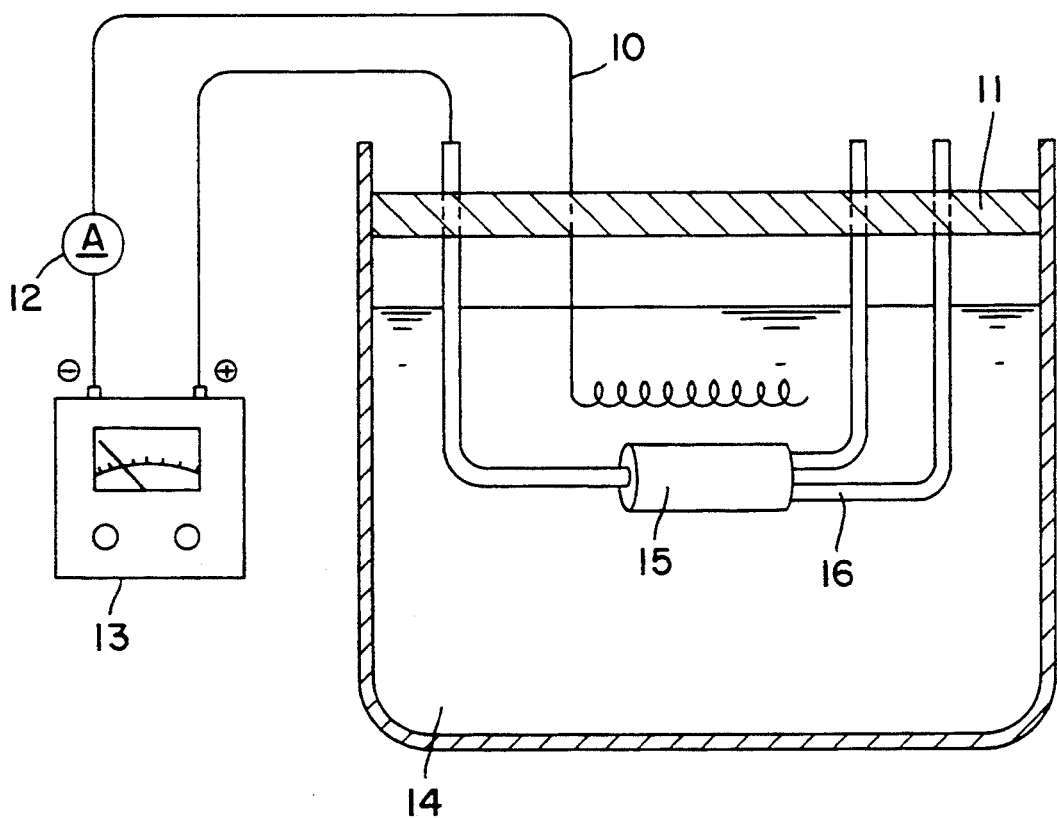
FIG. 3 is a view showing the device for evaluating waterproofness.

The harness was kept in a horizontal position and exposed to flames for 15 seconds. Once the exposure to flame is stopped, the fire caught by the harness died down spontaneously in 30 seconds. This operation was repeated flour more times. In all the cases, the fire died down in 30 seconds and no part of the harness did drop irrespective of whether the burning accompanied flames or not. Thus, the harness showed superb flame retardancy. Also, as shown in FIG. 3, after immersing the harness in salt water for 24 hours, 50 volts DC was applied thereto. The leakage current was 0.5 $\mu A$. This shows that the adhesive has sufficiently high waterproof properties.

In FIG. 3, 10 represents copper wire, 11 represents a supporter, 12 represents a DC ammeter, 13 represents a DC power supply, 14 represents salt water (5% wt.), 15 represents a harness joint and 16 represents wire insulated by PVC.

By adding 1–5 parts by weight of antioxidant to the adhesive, its waterproofness can be kept unchanged even after leaving it for 40 days at 125° C.

Examples and Comparative Examples are shown in Tables 1–3.

Each of tile resin compositions and additives shown was kneaded for 15 minutes on a roll heated to 140° C. and pressed into a sheet. Samples obtained by punching the sheets and having a thickness of 2 mm, a length of 127 mm and a width of 12.7 mm were subjected to burning tests defined in the UL94 standard to evaluate the flame retardancy.

V-0:
1) not burn in flames for 10 seconds or longer every time after exposed to flames twice.
2) burning with or without flames shall not reach the support clamp.
3) droppings in flames shall not set the underlying absorbent cotton on fire.
4) not burn without flames for 30 seconds or longer after second exposure to flames.

V-1;
1) not burn in flames for 30 seconds or longer every time after exposed to flames twice.
2) burning with or without flames shall not reach the support clamp.
3) droppings in flames shall not set the underlying absorbent cotton on fire.
4) not burn without flames for 60 seconds or longer after second exposure to flames.

V-2:
1) not burn in flames for 30 seconds or longer every time after exposed to flames twice.
2) burning with or without flames shall not reach the support clamp.
3) droppings in flames sometimes set the underlying absorbent cotton on fire.
4) not burn without flames for 60 seconds or longer after second exposure to flames.

In order to evaluate the bond strength of the adhesive, polyethylene, PVC and EVA resins were formed into flat and smooth-surfaced sheets and sheets (2 cm wide and 2 mm thick) made of the adhesive according to the present invention were put on the respective sheets. They were then sandwiched between iron plates coated with a fluororesin, pressed and heated for 10 minutes at 150° C. After cooling to room temperature, the bond strengths between the respective sheets and adhesive sheets were measured by drawing them with a tension tester made by INSTRON at a tensioning speed of 50 ram/rain, The measured values obtained were divided by 2 cm, that is the width of the sheets and expressed in kg/cm, The sample plates showed a bond strength of 0.2 kg/cm or higher with respect to the sample plates made of polyethylene, PVC (polyvinyl chloride) and an ethylene-vinyl acetate copolymer.

Industrial Applicability

As has been described so far, the flame-retardant adhesive according to the present invention shows good fluidity when it is subjected to external force and never flows if it catches fires. Thus, the fire will not spread. This adhesive is especially suited for use as an inner layer material of a heat-shrinkable tube.

Such a heat-shrinkable tube is very useful for applications where high flame retardancy is required, e.g., in automobile harness and buildings.

TABLE 1

| Example | 1 | 2 | 3 | 4 | 5 | 6 | 7 | 8 | 9 | 10 |
|---|---|---|---|---|---|---|---|---|---|---|
| EVA | 100 | 100 | 100 | 100 | 100 | | | | | |
| Polyester type | | | | | | 100 | 100 | | | |
| Polyamide type | | | | | | | | 100 | 100 | 100 |
| Decabromodiphenylether (Br: 83.3%) | 30 | 30 | 30 | 30 | 30 | 35 | | 30 | 30 | |
| Perchloropentacyclodecane (Cl: 66~77%) | | | | | | | 30 | | | 35 |
| Antimony trioxide | 5 | 5 | 5 | 5 | 5 | 10 | 15 | 5 | 5 | 10 |
| Particulate silica (particle diam. 0.15 μm) | 1 | 3 | 5 | | | | | | | |
| Particulate silica (particle diam. 4.0 μm) | | | | 5 | 10 | 5 | 15 | 15 | | |
| Particulate silica (particle diam. 30 μm) | | | | | | | | | 15 | 20 |
| Flame-retardant level UL94 | V-1 | V-0 | V-0 | V-1 | V-0 | V-0 | V-0 | V-0 | V-0 | V-0 |
| MI (190° C. g/10 min.) | 135 | 92 | 83 | 106 | 89 | 45 | 32 | 53 | 49 | 39 |
| Bonding force (kg/cm$^2$) | | | | | | | *1 | | | |
| To polyethylene | 3.91 | 2.78 | 2.62 | 2.90 | 2.75 | 0.21 | 0.13 | 0.49 | 0.40 | 0.37 |
| To PVC | 0.42 | 0.37 | 0.32 | 0.55 | 0.36 | 0.63 | 0.64 | 2.87 | 1.83 | 1.01 |
| To EVA | 5.63 | 4.47 | 4.51 | 6.35 | 3.92 | 7.82 | 6.75 | 0.89 | 0.45 | 0.32 |
| Entire tube (outer layer material A) | | | | | | | | | | |
| Waterproof properties*2 | ◯ | ◯ | ◯ | ◯ | ◯ | ◯ | ◯ | ◯ | ◯ | ◯ |
| Flame retardancy | ◯ | ◯ | ◯ | ◯ | ◯ | ◯ | ◯ | ◯ | ◯ | ◯ |

*1: Bonding force is weak to polyethylene but good to PVC. Thus, it is suitable for PVC wire.
*2: For evaluation of waterproof properties a harness joint made of PVC-insulated wire was used.

TABLE 2

| Comparative example | 1 | 2 | 3 | 4 | 5 | 6 | 7 |
|---|---|---|---|---|---|---|---|
| EVA | 100 | 100 | | 100 | | | |
| Polyester type | | | 100 | | 100 | | |
| Polyamide type | | | | 100 | | 100 | 100 |
| Decabromodiphenylether (Br: 83.3%) | 30 | | 30 | 30 | 30 | 35 | |
| Perchloropentacyclodecane (Cl: 66~77%) | | | | | | | 35 |
| Tetrabromobisphenol A (Br: 61%) | | 40 | | | | | |
| Antimony trioxide | 5 | 5 | 0 | 5 | 5 | 10 | 10 |
| Particulate silica (particle diam. 0.15 μm) | 25 | | | | 5 | | |
| Particulate silica (particle diam. 4.0 μm) | | 10 | | | | 5 | |
| Particulate silica (particle diam. 30 μm) | | | | | | | |
| Silica (particle diam. over 50 μm) | | | | 10 | | | 40 |
| Flame-retardant level UL94 | V-0 | V-1 | V-2 | Failed | V-0 | V-0 | V-1 |
| MI (190° C. g/10 min.) | 18 | 14 | 63 | 286 | 83 | 45 | 39 |
| Bonding force (kg/cm$^2$) | | | | | | | |
| To polyethylene | 1.03 | 0.64 | 0.64 | 0.42 | 2.62 | 1.02 | 0.09 |
| To PVC | 0.11 | 0.08 | 0.33 | 3.42 | 0.32 | 0.63 | 0.18 |
| To EVA | 1.02 | 0.55 | 1.75 | 1.31 | 4.51 | 7.82 | 0.33 |
| Entire tube (outer layer material A) | | | | | | | |
| Waterproofness | X | X | ◯ | ◯ | ◯ | ◯ | X |
| Flame retardancy | ◯ | ◯ | X | X | ◯ | ◯ | X |
| Entire tube (outer layer material B) | | | | | | | |
| Waterproofness*2 | X | X | ◯ | ◯ | ◯ | ◯ | X |
| Flame retardancy | X | X | X | X | X | X | X |

*2: For evaluation of water proofness, harness joint made of PVC-insulated wire was used.

TABLE 3

| Outer layer material used | A (flame-retardant) | B (non-flame-retardant) |
|---|---|---|
| Base polymer (PE type) | 100 | 100 |
| Decabromodiphenylether | 30 | 0 |
| Antimony trioxide | 5 | 0 |
| UL all tubing flame test | Passed | Failed |

Note) Base polymer contains an adequate amount of antioxidant.

We claim:

1. A flame-retardant adhesive comprising 100 parts by weight of a resin composition having an MI value (at 190° C.) of 30-220, 5-40 parts by weight of a chloric or bromic flame-retardant wherein said chloric flame-retardant contains 65 wt % or more of chlorine and said bromic flame-retardant contains 80 wt % or more of bromine, 1-30 parts by weight of an inorganic flame-retardant and 0.1-20 parts by weight of silica powder having an average particle diameter of 0.01 to 40 microns.

2. The flame-retardant adhesive as claimed in claim 1 wherein said resin composition is selected from the group consisting of a resin obtained by polymerizing ethylene and vinyl acetate as main monomers and having a melting point between 60° C. and 100° C., a polyester resin having a melting point between 80° C. and 190° C. and a polyamide resin having a melting point between 50° C. and 95° C.

3. The flame-retardant adhesive as claimed in claim 1, which shows a bond strength of 0.2 kg/cm or higher as measured by bonding said adhesive to flat and smooth-surfaced sample plates made of polyethylene, PVC (polyvinyl chloride) and an ethylene-vinyl acetate copolymer, cooling said adhesive and said sample plates to room temperature, and pulling said adhesive with a tension tester in such a direction that said adhesive is peeled off from the sample plates.

4. A heat-shrinkable tube comprising a heat-shrinkable tube body having an inner and outer surface, and a flame-retardant adhesive applied to said inner surface, said flame-retardant adhesive comprising 100 parts by weight of a resin composition having an MI value at (190° C.) of 30–220, 5–40 parts by weight of a chloric or bromic flame retardant, wherein said chloric flame-retardant contains 65 wt % or more of chlorine and said bromic flame-retardant contains 80 wt % or more of bromine, 1–30 parts by weight of an inorganic flame-retardant and 0.1–20 parts by weight of silica powder having an average particle diameter of 0.01 to 40 microns.

5. The heat-shrinkable tube as claimed in claim 4, wherein said heat-shrinkable tube body comprises a base resin which comprises one or a mixture of two of polyethylene, an ethylene-vinyl acetate copolymer and an ethylene-ethyl acrylate copolymer, 5–40 parts by weight of a chloric or bromic flame-retardant, and 1–30 parts by weight of inorganic flame-retardant and wherein said tube body without said adhesive exhibits a flame retardancy high enough to pass the All Tubing Flame Test, which is a flame-retardancy evaluation test defined in the UL standard.

6. A harness having a waterproof joint portion, said joint portion being covered with a heat-shrinkable tube comprising a heat-shrinkable tube body having an inner and outer surface and having a flame-retardant adhesive applied to said inner surface, said flame-retardant adhesive comprising 100 parts by weight of a resin composition having an MI value (at 190° C.) of 30–220, 5–40 parts by weight of a chloric or bromic flame retardant, wherein said chloric flame-retardant contains 65 wt % or more of chlorine and said bromic flame-retardant contains 80 wt % or more of bromine, 1–30 parts by weight of an inorganic flame-retardant and 0.1–20 parts by weight of silica powder having an average particle diameter of 0.01 to 40 microns.

* * * * *